(12) United States Patent
Kelley et al.

(10) Patent No.: US 7,341,806 B2
(45) Date of Patent: Mar. 11, 2008

(54) BATTERY HAVING CARBON FOAM CURRENT COLLECTOR

(75) Inventors: Kurtis C. Kelley, Washington, IL (US); Charles F. Ostermeier, Ames, IA (US); Matthew J. Maroon, Grayslake, IL (US)

(73) Assignee: Caterpillar Inc., Peoria, IL (US)

( * ) Notice: Subject to any disclaimer, the term of this patent is extended or adjusted under 35 U.S.C. 154(b) by 696 days.

(21) Appl. No.: 10/326,257

(22) Filed: Dec. 23, 2002

(65) Prior Publication Data

US 2004/0121238 A1 Jun. 24, 2004

(51) Int. Cl.
*H01M 8/00* (2006.01)
(52) U.S. Cl. .................... 429/245; 429/225
(58) Field of Classification Search ........... 429/245, 429/228, 223, 222, 221, 229, 218.2, 445, 429/126.1, 225; 423/445; 427/126.1; 29/623.1
See application file for complete search history.

(56) References Cited

U.S. PATENT DOCUMENTS

| | | | |
|---|---|---|---|
| 1,285,660 A | 11/1918 | Ford | |
| 2,620,369 A | 12/1952 | Daniel | 136/111 |
| 2,658,099 A | 11/1953 | Basset | 136/121 |
| 2,843,649 A | 7/1958 | Louis | 136/111 |
| 3,021,379 A | 2/1962 | Jackel | 136/145 |
| 3,188,242 A | 6/1965 | Kordesch et al. | 136/86 |
| 3,442,717 A | 5/1969 | Horn et al. | 136/176 |
| 3,510,359 A | 5/1970 | Selover, Jr. et al. | 136/146 |
| 3,565,694 A | 2/1971 | Chireau | 136/121 |
| 3,597,829 A | 8/1971 | Wagner et al. | 29/420.5 |
| 3,635,676 A | 1/1972 | Sands | |
| 3,832,426 A | 8/1974 | Malthouse et al. | |
| 3,833,424 A | 9/1974 | Louis et al. | 136/86 |
| 3,857,913 A | 12/1974 | Crow et al. | |
| 3,960,770 A | 6/1976 | Raley, Jr. et al. | |
| 4,011,374 A | 3/1977 | Kaun | 429/220 |
| 4,086,404 A | 4/1978 | Vissers et al. | 429/220 |
| 4,098,967 A | 7/1978 | Biddick et al. | 429/210 |
| 4,125,676 A | 11/1978 | Maricle et al. | |
| 4,134,192 A | 1/1979 | Parkinson et al. | 29/2 |

(Continued)

FOREIGN PATENT DOCUMENTS

EP 0 555 978 A1 8/1993

(Continued)

OTHER PUBLICATIONS

Czerwinski et al., "Electrochemical Behavior of Lead Dioxide Deposited on Reticulated Vitreous Carbon (RVC)," Journal of Power Sources, vol. 64, pp. 29-34, (1997).

(Continued)

*Primary Examiner*—Patrick Joseph Ryan
*Assistant Examiner*—Monique Wills
(74) *Attorney, Agent, or Firm*—Finnegan, Henderson, Farabow, Garrett & Dunner, L.L.P.

(57) ABSTRACT

A battery cell includes a negative current collector and at least one carbon foam positive current collector disposed within the cell such that the negative current collector at least partially surrounds the at least one carbon foam positive current collector. An insulating mat is disposed between the negative current collector and the at least one carbon foam positive current collector.

35 Claims, 3 Drawing Sheets

U.S. PATENT DOCUMENTS

| | | | |
|---|---|---|---|
| 4,152,825 A | 5/1979 | Bruneau | 29/623.2 |
| 4,188,464 A | 2/1980 | Adams et al. | 429/210 |
| 4,224,392 A | 9/1980 | Oswin | 429/206 |
| 4,275,130 A | 6/1981 | Rippel et al. | 429/144 |
| 4,339,322 A | 7/1982 | Balko et al. | 204/255 |
| 4,363,857 A | 12/1982 | Mix | 429/204 |
| 4,374,186 A | 2/1983 | McCartney et al. | 429/154 |
| 4,485,156 A | 11/1984 | Tokunaga | 429/204 |
| 4,566,877 A | 1/1986 | Pazdej et al. | |
| 4,717,633 A | 1/1988 | Hauser | 429/209 |
| 4,749,451 A | 6/1988 | Naarmann | 204/58.5 |
| 4,758,473 A | 7/1988 | Herscovici et al. | 428/408 |
| 4,865,931 A | 9/1989 | McCullough, Jr. et al. | 429/194 |
| 4,900,643 A | 2/1990 | Eskra et al. | 429/241 |
| 5,017,446 A | 5/1991 | Reichman et al. | 421/225 |
| 5,106,709 A | 4/1992 | Tekkanat et al. | 429/210 |
| 5,162,172 A | 11/1992 | Kaun | 429/155 |
| 5,200,281 A | 4/1993 | Leap et al. | 429/129 |
| 5,208,003 A | 5/1993 | Simandl et al. | |
| 5,223,352 A | 6/1993 | Pitts et al. | 429/225 |
| 5,229,228 A | 7/1993 | Doniat et al. | 429/234 |
| 5,260,855 A | 11/1993 | Kaschmitter et al. | 361/502 |
| 5,268,395 A | 12/1993 | Simandl et al. | |
| 5,300,272 A | 4/1994 | Simandl et al. | |
| 5,348,817 A | 9/1994 | Rao et al. | 429/210 |
| 5,374,490 A | 12/1994 | Aldecoa | 429/152 |
| 5,393,619 A | 2/1995 | Mayer et al. | 429/152 |
| 5,395,709 A | 3/1995 | Bowker et al. | 429/152 |
| 5,402,306 A | 3/1995 | Mayer et al. | 361/502 |
| 5,411,818 A | 5/1995 | Barlow et al. | 429/185 |
| 5,426,006 A | 6/1995 | Delnick et al. | 429/218 |
| 5,429,893 A | 7/1995 | Thomas | 429/218 |
| 5,441,824 A | 8/1995 | Rippel | 429/53 |
| 5,474,621 A | 12/1995 | Barnard | 136/256 |
| 5,498,489 A | 3/1996 | Dasgupta et al. | 424/152 |
| 5,508,131 A | 4/1996 | Bowen et al. | 429/210 |
| 5,512,390 A | 4/1996 | Obushenko | 429/204 |
| 5,529,971 A | 6/1996 | Kaschmitter et al. | |
| 5,538,810 A | 7/1996 | Kaun | 429/129 |
| 5,543,247 A | 8/1996 | Pulley et al. | 429/129 |
| 5,563,007 A | 10/1996 | Young et al. | 429/139 |
| 5,569,563 A | 10/1996 | Ovshinsky et al. | 429/223 |
| 5,580,676 A | 12/1996 | Honda et al. | 429/131 |
| 5,593,797 A | 1/1997 | Brecht | |
| 5,595,840 A | 1/1997 | Henning et al. | 429/210 |
| 5,626,977 A | 5/1997 | Mayer et al. | |
| 5,636,437 A | 6/1997 | Kaschmitter et al. | 29/825 |
| 5,643,684 A | 7/1997 | Tsubouchi et al. | 428/605 |
| 5,667,909 A | 9/1997 | Rodriguez et al. | 429/127 |
| 5,677,075 A | 10/1997 | Fujita | 429/48 |
| 5,705,259 A | 1/1998 | Mrotek et al. | 429/209 |
| 5,712,054 A | 1/1998 | Kejha | 429/21 |
| 5,723,232 A | 3/1998 | Yamada et al. | 429/245 |
| 5,738,907 A | 4/1998 | Vaccaro et al. | 427/172 |
| 5,766,797 A | 6/1998 | Crespi et al. | 429/197 |
| 5,882,621 A | 3/1999 | Doddapaneni et al. | 423/445 |
| 5,888,469 A | 3/1999 | Stiller et al. | |
| 5,898,564 A | 4/1999 | Mayer et al. | |
| 5,932,185 A | 8/1999 | Pekala et al. | |
| 5,955,215 A | 9/1999 | Kurzweil et al. | 429/41 |
| 5,993,996 A | 11/1999 | Firsich | 429/231.8 |
| 6,001,761 A | 12/1999 | Hata et al. | 501/103 |
| 6,033,506 A | 3/2000 | Klett | |
| 6,037,032 A | 3/2000 | Klett et al. | |
| 6,045,943 A | 4/2000 | Nowaczyk | 429/160 |
| 6,060,198 A | 5/2000 | Snaper | 429/233 |
| 6,077,464 A | 6/2000 | Murdie et al. | |
| 6,077,623 A | 6/2000 | Grosvenor et al. | 429/210 |
| 6,103,149 A | 8/2000 | Stankiewicz | |
| 6,117,592 A | 9/2000 | Hoshino et al. | 429/235 |
| 6,127,061 A | 10/2000 | Shun et al. | 429/40 |
| 6,146,780 A | 11/2000 | Cisar et al. | 429/34 |
| 6,183,854 B1 | 2/2001 | Stiller et al. | |
| 6,193,871 B1 | 2/2001 | Coates et al. | 205/170 |
| 6,217,841 B1 | 4/2001 | Grindatto et al. | |
| 6,241,957 B1 | 6/2001 | Stiller et al. | |
| 6,245,461 B1 | 6/2001 | Smith et al. | 429/231.8 |
| 6,248,467 B1 | 6/2001 | Wilson et al. | 429/39 |
| 6,258,473 B1 | 7/2001 | Spillman et al. | 429/9 |
| 6,261,485 B1 | 7/2001 | Klett | |
| 6,287,721 B1 | 9/2001 | Xie et al. | 429/152 |
| 6,296,746 B1 | 10/2001 | Broman et al. | 204/294 |
| 6,316,148 B1 | 11/2001 | Timmons et al. | 429/241 |
| 6,319,627 B1 | 11/2001 | Snyder et al. | 429/62 |
| 6,323,160 B1 | 11/2001 | Murdie et al. | |
| 6,332,990 B1 | 12/2001 | Mayer et al. | |
| 6,346,226 B1 | 2/2002 | Stiller et al. | |
| 6,379,845 B1 | 4/2002 | Inazawa et al. | 429/235 |
| 6,383,687 B1 | 5/2002 | Gibbons et al. | 429/233 |
| 6,387,343 B1 | 5/2002 | Klett | |
| 6,395,423 B1 | 5/2002 | Kawakami et al. | 429/215 |
| 6,399,149 B1 | 6/2002 | Klett et al. | |
| 6,438,964 B1 | 8/2002 | Giblin | |
| 6,500,401 B2 | 12/2002 | Reznek et al. | 423/445 |
| 6,528,204 B1 | 3/2003 | Hikmet et al. | 429/128 |
| 6,566,004 B1 | 5/2003 | Fly et al. | 429/39 |
| 6,569,559 B1 | 5/2003 | Rouillard et al. | 429/120 |
| 6,576,365 B1 | 6/2003 | Meitav et al. | 429/130 |
| 6,605,390 B1 | 8/2003 | Moore et al. | 429/231.8 |
| 6,631,073 B1 | 10/2003 | Sakata et al. | 361/502 |
| 6,878,487 B2 * | 4/2005 | Cho et al. | 429/212 |
| 7,060,391 B2 | 6/2006 | Gyenge et al. | |
| 2001/0019800 A1 | 9/2001 | Herreyre et al. | |
| 2002/0027066 A1 | 3/2002 | Kanno et al. | |
| 2002/0061436 A1 | 5/2002 | Inagaki et al. | |
| 2002/0081478 A1 | 6/2002 | Busenbender | |
| 2002/0106561 A1* | 8/2002 | Lee et al. | 429/218.1 |
| 2002/0114990 A1 | 8/2002 | Fly et al. | |
| 2002/0136680 A1 | 9/2002 | Kanno et al. | |
| 2002/0150822 A1 | 10/2002 | Marlow et al. | |
| 2003/0003343 A1 | 1/2003 | Cisar et al. | |
| 2003/0054240 A1* | 3/2003 | Aronsson | 429/157 |
| 2003/0099884 A1 | 5/2003 | Chiang et al. | |
| 2003/0104280 A1 | 6/2003 | Venkatesan et al. | |
| 2003/0108785 A1 | 6/2003 | Wu et al. | |
| 2003/0162086 A1* | 8/2003 | Longhi et al. | 429/94 |
| 2004/0058220 A1* | 3/2004 | Liu et al. | 429/38 |
| 2005/0191555 A1* | 9/2005 | Kelley et al. | 429/245 |

FOREIGN PATENT DOCUMENTS

| | | |
|---|---|---|
| EP | 1225160 | 7/2002 |
| GB | 18590 | 8/1910 |
| JP | 61270205 | 11/1986 |
| JP | 63057649 | 3/1988 |
| JP | 6418982 | 1/1989 |
| JP | 2002220217 | 8/2002 |
| WO | WO 95/06002 | 3/1995 |
| WO | WO 98/02382 | 1/1998 |
| WO | WO 98/27023 | 6/1998 |
| WO | WO 99/11585 | 3/1999 |
| WO | WO 99/11586 | 3/1999 |
| WO | WO 99/61549 | 12/1999 |
| WO | WO 99/64223 | 12/1999 |
| WO | WO 00/16418 | 3/2000 |
| WO | WO 00/43314 | 7/2000 |
| WO | WO 01/66490 | 9/2001 |
| WO | WO 02/18271 | 3/2002 |
| WO | WO 02/18272 | 3/2002 |
| WO | WO 02/094533 | 11/2002 |

| WO | WO 03/028130 | 4/2003 |

OTHER PUBLICATIONS

Blood et al., "Electrodeposition of Lead Dioxide on Carbon Substrates From a High Internal Phase Emulsion (HIPE)," Journal of Applied Electrochemistry, vol. 34, pp. 1-7, (2004).

http://www.powertechnologyonline.com/progress.html, Power Technology, Inc., Jan. 15, 2002.

U.S. Appl. No. 10/183,471, filed Jun. 28, 2002.

U.S. Appl. No. 10/324,068, filed Dec. 20, 2002.

* cited by examiner

BATTERY HAVING CARBON FOAM CURRENT COLLECTOR

TECHNICAL FIELD

This invention relates generally to a battery and, more particularly, to a lead acid battery including a carbon foam current collector.

BACKGROUND

Lead acid batteries are known to include at least one positive current collector, at least one negative current collector, and an electrolytic solution including, for example, sulfuric acid ($H_2SO_4$) and distilled water. Ordinarily, both the positive and negative current collectors in a lead acid battery are configured as lead grid-like plates. The role of these lead current collectors is to transfer electric current to and from the battery terminals during the discharge and charging processes. Storage and release of electrical energy in lead acid batteries is enabled by chemical reactions that occur in a paste disposed on the current collectors. A notable limitation to the durability of lead acid batteries is corrosion of the lead material of the positive current collector.

The rate of corrosion of the positive current collector is a major factor in determining the life of the lead acid battery. Once the sulfuric acid electrolyte is added to the battery and the battery is charged, each positive current collector of the battery is continually subjected to corrosion due to its exposure to sulfuric acid and to the anodic potentials of the positive collector. One of the most damaging effects of this corrosion is volume expansion. Particularly, as the positive current collector corrodes, lead dioxide is formed from the lead source metal of the current collector. This lead dioxide corrosion product has a greater volume than the lead source material consumed to create the lead dioxide. Corrosion of the lead source material and the ensuing increase in volume of the lead dioxide corrosion product is known as volume expansion.

Volume expansion induces mechanical stresses on the current collector that deform and stretch the current collector. At a total volume increase of the current collector of approximately 4% to 7%, the current collector may fracture. As a result, battery capacity drops, and eventually, the battery will reach the end of its service life. Additionally, at advanced stages of corrosion, internal shorting within the current collector and rupture of the cell case can occur. Both of these corrosion effects may lead to failure of one or more of the cells within the battery.

One method of extending the service life of a lead acid battery is to increase the corrosion resistance of the positive current collector. Several methods have been proposed for inhibiting the corrosion process in lead acid batteries. Because carbon does not oxidize at the temperatures at which lead acid batteries generally operate, some of these methods have involved using carbon in various forms to slow or prevent the detrimental corrosion process. For example, U.S. Pat. No. 5,512,390 (hereinafter the '390 patent) discloses a lead acid battery that includes current collectors made from graphite plates instead of lead. The graphite plates have sufficient conductivity to function as current collectors, and they are more corrosion resistant than lead. Substituting graphite plates for the lead current collectors may, therefore, lengthen the life of a lead acid battery.

While the battery of the '390 patent may potentially offer a lengthened service life as a result of reduced corrosion of the positive current collector, the graphite plates of the '390 patent are problematic. For example, the graphite plates of the '390 patent are dense, flat sheets of material each having a relatively small amount of surface area. Unlike lead electrode plates of a conventional lead acid battery, which are generally patterned into a grid-like structure to increase the available surface area of the plates, the graphite plates of the '390 patent are smooth sheets with no patterning. In lead acid batteries, an increase in surface area of the current collector may increase the specific energy of the battery and, therefore, may translate into improved battery performance. More surface area on the current collectors may also lead to a reduction in the time required for charging and discharging of the battery. The relatively small surface area of the graphite plates of the '390 patent results in poorly performing batteries that have slow charging speeds.

Additionally, the graphite plates of the '390 patent lack the toughness of lead current collectors. The dense graphite plates of the '390 patent are brittle and may fracture when subjected to physical shock or vibration. Such physical shock and vibration commonly occur in vehicular applications, for example. Any fracturing of the graphite plates would lead to the same problems caused by volume expansion of ordinary lead current collectors. Therefore, despite offering an increased resistance to corrosion compared to conventional lead current collectors, the brittle nature of the graphite plates of the '390 patent could actually result in battery service lives shorter than those possible through use of ordinary lead current collectors.

SUMMARY OF THE INVENTION

One aspect of the present invention includes a cell for a battery. The cell includes a negative current collector and at least one carbon foam positive current collector disposed within the cell such that the negative current collector at least partially surrounds the at least one carbon foam positive current collector. An insulating mat is disposed between the negative current collector and the at least one carbon foam positive current collector.

A second aspect of the present invention includes a method of making a cell for a battery. The method includes the steps of providing at least one carbon foam positive current collector and applying a first chemically active paste to the at least one carbon foam positive current collector. Next, the first chemically active paste is cured, and the at least one carbon foam positive current collector is surrounded with an insulating mat to form at least one positive current collector assembly. A negative current collector having at least one receptacle is provided, and each of the at least one positive current assemblies is inserted into a respective receptacle of the negative current collector.

A third aspect of the present invention includes a battery. The battery has a housing and both a positive terminal and a negative terminal. At least one cell is disposed within the housing. The at least one cell includes a negative current collector and at least one carbon foam positive current collector disposed within the cell such that the negative current collector at least partially surrounds the at least one carbon foam positive current collector. An insulating mat is disposed between the negative current collector and the at least one carbon foam positive current collector. An electrolytic solution is disposed within the housing and at least partially immerses the at least one cell.

BRIEF DESCRIPTION OF THE DRAWINGS

The accompanying drawings, which are incorporated in and constitute a part of this specification, illustrate exemplary embodiments of the invention and, together with the written description, serve to explain the principles of the invention. In the drawings.

DETAILED DESCRIPTION

Figure 1:
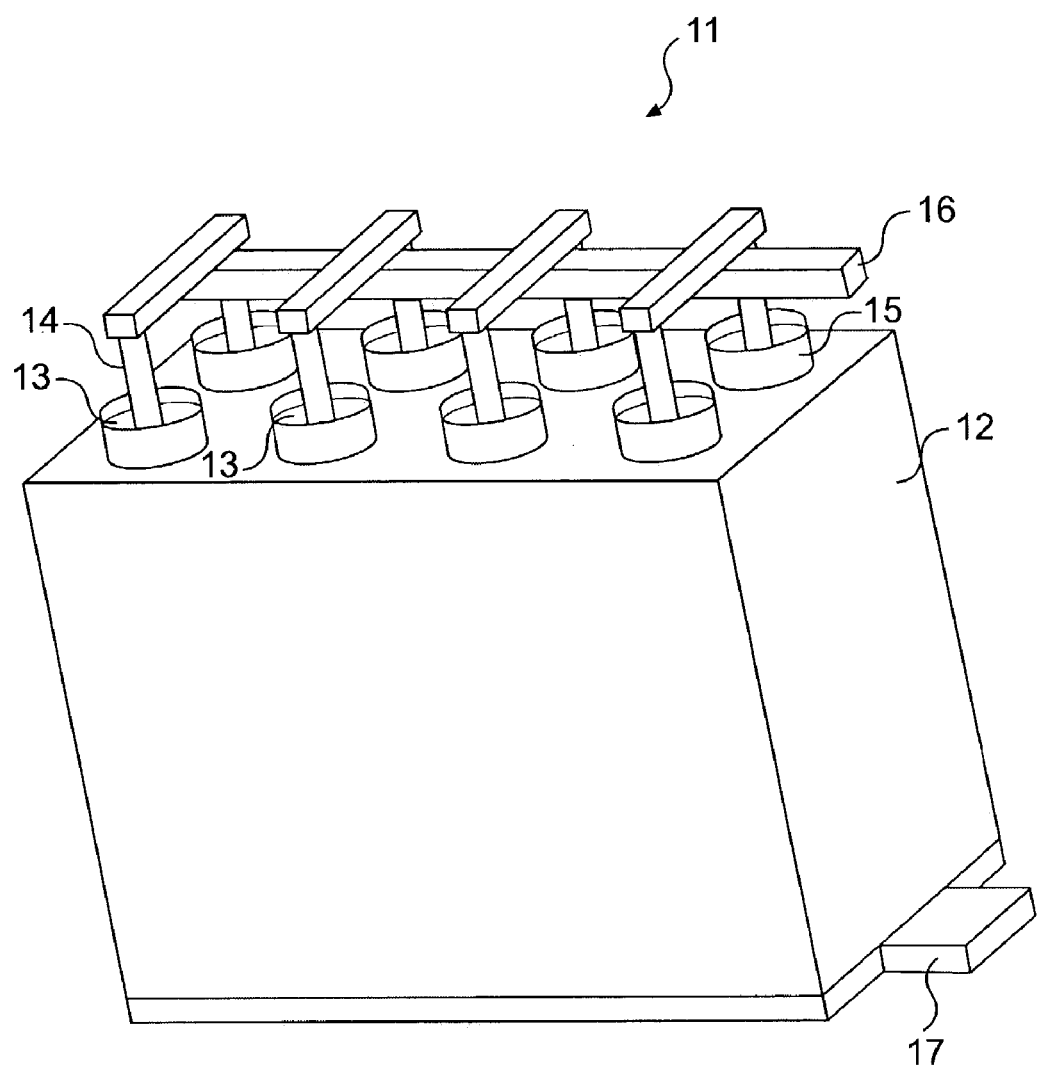
FIG. 1 is a diagrammatic perspective view of a battery cell in accordance with an exemplary embodiment of the present invention.
Figure 2:
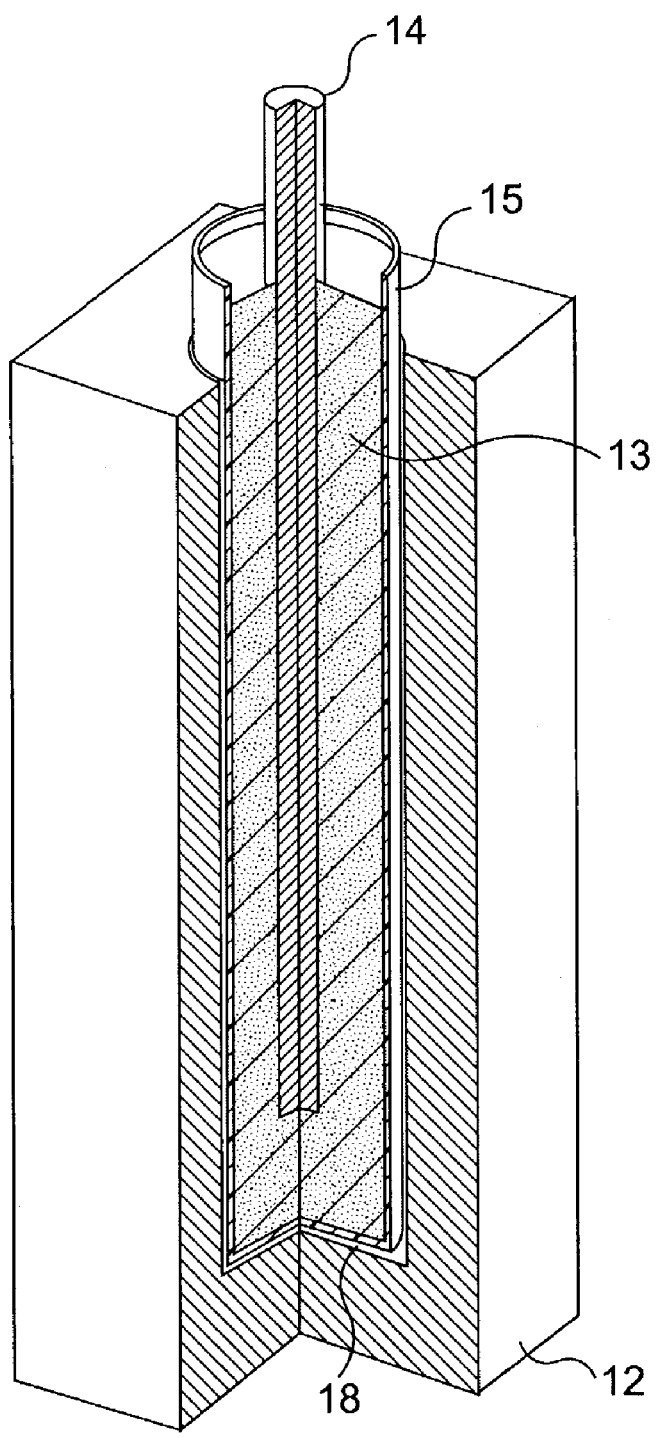
FIG. 2 is a diagrammatic cut-away perspective view of a single battery cell element in accordance with an exemplary embodiment of the present invention.

FIG. 1 illustrates a cell 11 of a lead acid battery, and FIG. 2 provides a cut-away view of a single element of cell 11. Cell 11 includes both a negative current collector 12 and at least one positive current collector 13. Unlike the cells of traditional lead acid batteries, which typically include an alternating series of positive and negative current collector plates arranged parallel to one another, cell 11 may be a modular structure. The term modular, as used herein, refers to an assembly of components that operate together and may be installed as a unit. For example, as shown in FIG. 2, each single element of cell 11 may comprise a cell module including positive current collector 13, an insulating mat 15, and negative current collector 12. Any number of modules may be combined together to provide a desired potential for cell 11.

As illustrated in FIGS. 1 and 2, negative current collector 12 may be configured as a single block of material that includes receptacles 18. This configuration, however, is merely exemplary. Negative current collector 12 may include any of a wide variety of different configurations to suit a particular application. For example, negative current collector 12 may be divided into individual elements each associated with a respective positive current collector. Regardless of the particular configuration of negative current collector 12, one or more positive current collectors 13 are disposed within cell 11 such that negative current collector 12 at least partially surrounds the one or more positive current collectors 13. In the exemplary embodiment shown in FIG. 1, an array of positive current collectors 13 may be disposed within respective receptacles 18 of negative current collector 12. While the array of positive current collectors of cell 11, as shown in FIG. 1, includes eight positive current collectors 13, a greater or lesser number of positive current collectors 13 may be utilized depending on a particular application.

Negative current collector 12 may be formed from various materials including, for example, porous lead foam or carbon foam. The porous lead foam of negative current collector 12 may have a reticulated structure such that from about 50% to about 97% of the volume of the porous lead foam is open space. The porosity of both lead foam and carbon foam allows the electrolyte of the lead acid battery to infiltrate negative current collector 12 and contact chemically active paste disposed on both negative current collector 12 and the at least one positive current collector 13.

Positive current collector 13 may be formed of carbon foam and can include many different configurations. In the exemplary embodiment illustrated in FIG. 2, positive current collector 13 is formed in the shape of a cylindrical pillar. Alternatively, positive current collector 13 may be configured to have a rectangular cross-section along its length (i.e., the rectangular cross-section lies in a plane normal to the longitudinal axis). Positive current collector 13 may include a lead core 14. While lead core 14 is an optional component of positive current collector 13, lead core 14 provides a convenient attachment point for making electrical contact with positive current collector 13.

Cell 11 includes an insulating mat 15 disposed around each positive current collector 13. Insulating mat 15 prevents short circuits between positive current collector 13 and negative current collector 12. Insulating mat 15 is porous and may be formed from glass, various polymers, or any other suitable insulating material.

Referring to FIG. 1, cell 11 may include a positive connector 16 in electrical contact with each of the positive current collectors 13 included in cell 11. Positive connector 16 may be made of lead, various other metals, or any other suitable conductive material. In the exemplary embodiment illustrated in FIG. 1, positive connector 16 makes electrical contact with each positive current collector 13 of cell 11 by connecting to lead cores 14, which may extend into respective positive current collectors 13, as shown in FIG. 2. Positive connector 16 may include, for example, a central lead post and a series of cross-members in contact with lead cores 14. Positive connector 16 also provides a contact point for creating an electrical contact between positive current collectors 13 and the positive terminal of a battery.

Cell 11 may include a negative connector 17 in electrical contact with negative current collector 12. Like positive connector 16, negative connector 17 may be made of lead, various other metals, or any other suitable conductive material. Negative connector 17 may be formed as an integral portion of negative current collector 12, or negative connector 17 may be a separate component, such as a grid, attached to negative current collector 12. Negative connector 17 provides a contact point for creating an electrical contact between negative current collector 12 and the negative terminal of a battery.

The carbon foam used to form positive current collector 13 and, optionally, negative current collector 12, is electrically conductive. In certain forms, the carbon foam may offer sheet resistivity values of less than about 1 ohm/cm. In still other forms, the carbon foam may have sheet resistivity values of less than about 0.75 ohm/cm.

Additionally, carbon foam is lightweight due to the presence of a network of pores. The carbon foam used to form positive current collector 13 and, optionally, negative current collector 12, may include a total porosity value of at least 60%. In other words, at least 60% of the volume of the carbon foam is included within pores. Moreover, the carbon foam may have an open porosity value of at least 90%, such that at least 90% of pores are open to adjacent pores. The open porosity of the carbon foam may result in a density of less than about 0.6 gm/cm$^3$.

Graphite foam, which is a type of carbon foam that includes areas of carbon atoms arranged in a graphite structure, may also be used to form positive current collector 13 and negative current collector 12. One such graphite foam, under the trade name PocoFoam™, is available from Poco Graphite, Inc. The density and pore structure of graphite foam may be similar to the more generic carbon foam. A primary difference between graphite foam and carbon foam is the orientation of the carbon atoms that make up the structural elements of the foam. For example, in carbon foam, the carbon may be primarily amorphous. In graphite foam, however, much of the carbon is ordered into a graphite, layered structure. Because of the ordered nature of the graphite structure, graphite foam typically offers higher conductivity than carbon foam. For example, Poco-Foam™ graphite foam exhibits electrical resistivity values of between about 100 µΩ/cm and about 400 µΩ/cm.

The present invention also includes a method of making a cell for a battery. As a first step for making cell 11, at least one positive current collector 13 may be formed from carbon foam into a desired configuration using wire EDM or some other suitable technique for shaping carbon foam. Next, a chemically active paste including lead oxide (PbO), for example, can be applied to positive current collector 13 such that the chemically active paste penetrates pores of the carbon foam positive current collector 13. Other oxides of lead may also be suitable. The paste may include various additives including, for example, varying percentages of free lead, structural fibers, conductive materials, carbon, and extenders to accommodate volume changes over the life of the battery. In practice, the constituents of the chemically active paste may be mixed with a small amount of sulfuric acid and water to form a paste that may be disposed within pores of the carbon foam of positive current collector 13.

Once applied, this chemically active paste is cured by exposing the pasted, positive current collector 13 to an environment of elevated temperature and humidity to encourage growth of lead sulfate crystals within the paste. Once the chemically active paste on positive current collector 13 has been cured, porous insulating mat 15 is wrapped around positive current collector 13 to form a positive current collector assembly.

As an optional step, a lead core 14 may be added to positive current collector 13. Lead core 14 provides some structural support for the positive current collector and provides a convenient attachment point for establishing an electrical contact with positive current collector 13. Lead core 14 may include a pre-made lead post that can be inserted into a recess formed in positive current collector 13. Alternatively, the lead core may be formed directly in the positive current collector. For example, positive current collector 13 can be configured to include a recess that extends along a longitudinal axis of the body. Using positive current collector 13 as a mold, molten lead can be poured directly into the recess to form lead core 14. An end portion of positive current collector 13 may be trimmed away, if desired, to expose a desired length of lead core 14.

Negative current collector 12 can be prepared, for example, by forming a block of carbon foam or lead foam including a plurality of receptacles 18. Other configurations are possible and may even be more suitable depending on a particular application. Each of the receptacles 18 may receive a positive current collector assembly including insulating mat 15 and positive current collector 13. After forming negative current collector 12, a chemically active paste is applied to negative current collector 12. Except for an optional step of drying, no curing of the pasted negative current collector 12 is required.

Once negative current collector 12 and a desired number of positive current collector assemblies have been prepared, cell 11 is assembled. Each of the desired number of positive current collector assemblies is inserted into a respective receptacle 18 of negative current collector 12. Positive connector 16 may be connected to each of positive current collectors 13 either before or after inserting the positive current collector assemblies into negative current collector 12. Additionally, negative connector 17, in the case where negative connector 17 is formed separately from negative current collector 12, can be attached to negative current collector 12 at any time during the preparation of the negative current collector 12.

Figure 3:
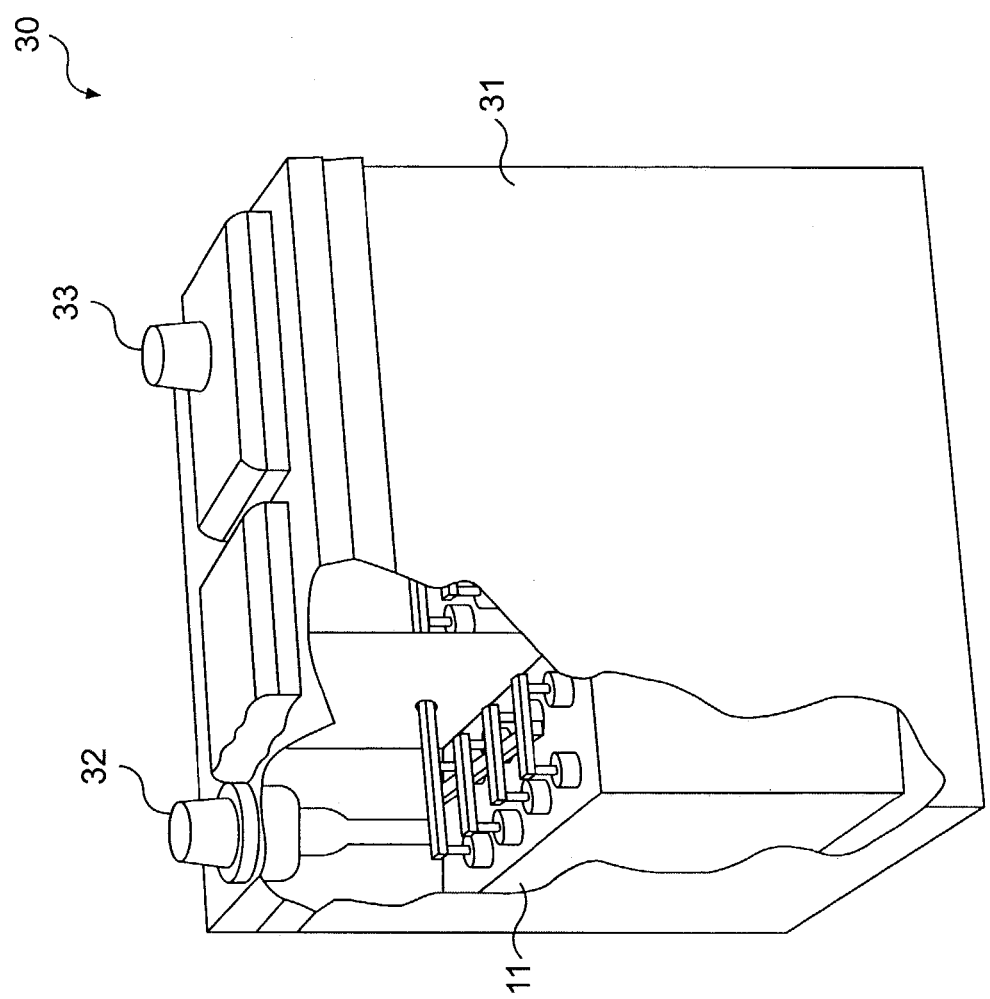
FIG. 3 is a diagrammatic cut-away perspective view of a battery in accordance with an exemplary embodiment of the present invention.

FIG. 3 illustrates a battery 30 in accordance with an exemplary embodiment of the present invention. Battery 30 includes a housing 31, a positive terminal 32, and a negative terminal 33. Both positive terminal 32 and negative terminal 33 may be either external or internal to housing 31. At least one cell 11 is disposed within housing 31. While only one cell 11 is necessary, multiple cells may be connected in series to provide a desired total potential of battery 30 or in parallel to provide additional power capability. For example, the positive connectors 16 of each cell 11 may be connected together, and the positive connectors from each of the cells may ultimately be connected to positive terminal 32. Similarly, negative connectors 17 of cells 11 can be connected together and to negative terminal 33.

Once the desired number of cells 11 have been disposed in battery 30, cells 11 are immersed in an electrolytic solution including, for example, sulfuric acid and distilled water. Next, battery 30 is subjected to a charging (i.e., formation) process. During this charging process, the cured paste of the positive current collectors is electrically driven to lead dioxide ($PbO_2$), and the paste of negative current collector 12 is converted to sponge lead. Conversely, during subsequent discharge of the battery 30, the pastes of both the positive current collectors 13 and negative current collector 12 convert toward lead sulfate.

INDUSTRIAL APPLICABILITY

The modular structure of the battery cell of the present invention, in which an array of one or more positive current collectors is disposed in a negative current collector, takes advantage of the high compressive strength of carbon foam. For example, during operation of a lead acid battery, gas bubbles may be generated. When generated within a carbon foam current collector, these gas bubbles tend to expand the carbon foam, which may lead to warping and other types of deformation. By at least partially surrounding each carbon foam positive current collector 13 with negative current collector 12, the negative current collector 12 supports the positive current collectors 13 and limits expansion caused by gas bubble generation. Because carbon foam has a high compressive strength, the positive current collector 13 can withstand being pressed against the negative current collector 12 as a result of expansion caused by gas bubble generation.

In general, carbon oxidizes only at very high temperatures and will resist corrosion even in highly corrosive environments. Because positive current collectors 13 and, optionally, negative current collector 12 include carbon foam, these current collectors resist corrosion even when exposed to sulfuric acid and to the anodic potentials of the positive current collector in a lead acid battery. As a result, the battery of the present invention may offer a significantly longer service life as compared to batteries without carbon foam current collectors.

Additionally, the porous nature of both the carbon foam used to form positive current collectors 13 and of the lead foam or carbon foam used to form negative current collector 12 translates into batteries having high specific energy values 30. Both carbon foam and lead foam are porous materials that offer a large amount of surface area for negative current collector 12 and each positive current collector 13. Current collectors composed of carbon foam or lead foam may exhibit more than 2000 times the amount of surface area provided by conventional lead current collectors. Because of the network of pores present in both carbon foam and lead foam, the chemically active paste of both the negative current collector 12 and the positive current collectors 13 is intimately integrated with the conductive carbon or lead material of the current collectors. Therefore, electrons produced in the chemically active paste at a particular reaction site travel only a short distance through the paste before encountering the conductive carbon foam of positive current collectors 13 or the conductive carbon or lead foam of negative current collector 12. This results in improved specific energy values. In other words, these batteries when placed under a load, may sustain their voltage above a predetermined threshold value for a longer time than batteries including either traditional lead grid current collectors or graphite plate current collectors.

By including carbon foam, positive current collectors having a density of less than about 0.6 g/cm$^3$, the battery of the present invention may weigh substantially less that batteries including positive current collector made from either lead grids or graphite plates.

It will be apparent to those skilled in the art that various modifications and variations can be made in the modular battery of the present invention without departing from the scope of the disclosure. Other embodiments of the battery cell will be apparent to those skilled in the art from consideration of the specification. It is intended that the specification and examples be considered as exemplary only, with a true scope of the disclosure being indicated by the following claims and their equivalents.

What is claimed is:

1. A lead acid battery cell, comprising:
   a negative current collector;
   at least one carbon foam positive current collector disposed within the lead acid battery cell such that the negative current collector at least partially surrounds the at least one carbon foam positive current collector; and
   an insulating mat disposed between the negative current collector and the at least one carbon foam positive current collector.

2. The cell of claim 1, further including a lead core disposed within and making electrical contact with the at least one carbon foam positive current collector.

3. The cell of claim 1, wherein the negative current collector is configured as a block of material including a receptacle for each of the at least one carbon foam positive current collector.

4. The cell of claim 1, wherein the negative current collector is formed of porous lead foam.

5. The cell of claim 1, wherein the negative current collector is formed of carbon foam.

6. The cell of claim 1, further including a first chemically active paste disposed on the at least one carbon foam positive current collector and a second chemically active paste disposed on the negative current collector.

7. The cell of claim 6, wherein the at least one carbon foam positive current collector includes pores and the first chemically active paste penetrates into the pores of the at least one carbon foam positive current collector.

8. The cell of claim 6, wherein both the first chemically active paste and the second chemically active paste include an oxide of lead.

9. The cell of claim 1, wherein the carbon foam positive current collector includes a total porosity value of at least about 60%.

10. The cell of claim 1, wherein the carbon foam positive current collector includes an open porosity value of at least about 90%.

11. The cell of claim 1, wherein the carbon foam positive current collector includes a density of less than about 0.6 gm/cm$^3$.

12. A method of making a cell for a lead acid battery, comprising:
    providing at least one carbon foam positive current collector;
    applying a first chemically active paste, including an oxide of lead, to the at least one carbon foam positive current collector;
    curing the first chemically active paste;
    surrounding, at least in part, the at least one carbon foam positive current collector with an insulating material to form at least one positive current collector assembly;
    providing a negative current collector having at least one receptacle; and
    inserting each of the at least one positive current collector assemblies at least partially into a respective receptacle of the negative current collector.

13. The method of claim 12, further including providing the at least one carbon foam current collector with a lead core.

14. The method of claim 12, further including applying a second chemically active paste to the negative current collector prior to inserting each of the at least one positive current collector assemblies into a respective receptacle of the negative current collector.

15. The method of claim 14, wherein the second chemically active paste includes lead oxide.

16. The method of claim 12, wherein the step of curing the first chemically active paste includes forming lead sulfate crystals within the first chemically active paste.

17. The method of claim 12, wherein the negative current collector is formed of porous lead foam.

18. The method of claim 12, wherein the negative current collector is formed of carbon foam.

19. The method of claim 12, further including subjecting the cell to a charging process after the step of inserting each of the at least one positive current assemblies into a respective receptacle of the negative current collector.

20. A lead acid battery comprising:
    a housing;
    a positive terminal;
    a negative terminal;
    at least one cell disposed within the housing, the at least one cell including:
      a negative current collector;
      at least one carbon foam positive current collector disposed within the at least one cell such that the negative current collector at least partially surrounds the at least one carbon foam positive current collector; and
      an insulating material disposed between the negative current collector and the at least one carbon foam positive current collector; and
    an acidic electrolytic solution disposed within the housing and at least partially immersing the at least one cell.

21. The battery of claim 20, further including a lead core disposed within and electrically coupled with the at least one carbon foam positive current collector.

22. The battery of claim 21, further including a positive connector electrically coupled with the positive terminal and the lead core of the at least one carbon foam positive current collector, and a negative connector electrically coupled with the negative terminal and the negative current collector.

23. The battery of claim 20, wherein the negative current collector includes porous lead foam.

24. The battery of claim 20, wherein the negative current collector includes carbon foam.

25. The battery of claim 20, further including a first chemically active paste disposed on the at least one carbon foam positive current collector and a second chemically active paste disposed on the negative current collector.

26. The battery of claim 25, wherein the at least one carbon foam positive current collector includes pores that are penetrated by the first chemically active paste.

27. The battery of claim 25, wherein the first chemically active paste and the second chemically active paste are the same material.

28. The battery of claim 20, wherein the insulating material is a porous mat.

29. A lead acid battery comprising:
a housing;
a positive terminal and a negative terminal;
at least one cell disposed within the housing, the at least one cell including:
  a porous, lead foam negative current collector including a plurality of receptacles;
  a plurality of carbon foam positive current collectors disposed within the plurality of receptacles such that the negative current collector at least partially surrounds each of the plurality of carbon foam positive current collectors, wherein each of the plurality of carbon foam positive current collectors includes a lead core;
  an insulating mat disposed between the negative current collector and each of the plurality of carbon foam positive current collectors; and
  a chemically active paste disposed on each of the plurality of carbon foam positive current collectors;

a positive connector in electrical contact with the positive terminal and each of the lead cores of the plurality of carbon foam positive current collectors of the at least one cell;

a negative connector in electrical contact with the negative terminal and the negative current collector of the at least one cell; and an acidic electrolytic solution disposed within the housing and at least partially immersing the at least one cell.

30. A cell for a lead acid battery, comprising:

a negative current collector;

at least one column-shaped carbon foam positive current collector disposed within the cell such that the negative current collector at least partially surrounds the at least one column-shaped carbon foam positive current collector;

an insulating material disposed between the negative current collector and the at least one column-shaped carbon foam positive current collector; and a chemically active material, including lead oxide, disposed on the at least one column-shaped carbon foam positive current collector.

31. The cell of claim 30, further including a core disposed within and making electrical contact with the at least one column-shaped carbon foam, positive current collector.

32. The cell of claim 31, wherein the core is lead.

33. The cell of claim 30, wherein the at least one column-shaped positive current collector is substantially cylindrical.

34. The cell of claim 30, wherein the negative current collector is formed of porous lead foam.

35. The cell of claim 30, wherein the negative current collector is formed of carbon foam.

* * * * *